United States Patent

White

[15] 3,694,747

[45] Sept. 26, 1972

[54] RF DIRECTIONAL POWER MONITOR

[72] Inventor: Winston Wayne White, Hillside, Ill.

[73] Assignee: Motorola, Inc., Franklin Park, Ill.

[22] Filed: July 22, 1970

[21] Appl. No.: 57,237

[52] U.S. Cl. .................324/95, 324/127, 333/9, 336/84
[51] Int. Cl. ...................G01r 21/04, H01p 5/12
[58] Field of Search ....324/95, 133, 126, 127; 333/6, 333/10, 24, 26, 9; 336/84, 195

[56] References Cited

UNITED STATES PATENTS

| | | | |
|---|---|---|---|
| 3,197,696 | 7/1965 | Bibo | 324/95 X |
| 3,505,615 | 4/1970 | Simons | 330/10 |
| 3,524,133 | 8/1970 | Arndt | 324/133 X |

*Primary Examiner*—Rudolph V. Rolinec
*Assistant Examiner*—Ernest F. Karlsen
*Attorney*—Mueller & Aichele

[57] ABSTRACT

An RF directional power monitor includes an air dielectric coaxial line section has inner and outer connectors separated by insulating supports and is equipped with printed circuit board terminals at opposite ends of the line. Provision is made for a multiple turn coupling loop between spaced openings in the outer coaxial conductor to permit a single basic assembly to be used over a wide RF power and frequency range merely by changing the number of turns of the coupling loop.

7 Claims, 2 Drawing Figures

INVENTOR.
WINSTON WAYNE WHITE

BY Mueller & Aichele

ATTORNEYS.

RF DIRECTIONAL POWER MONITOR

BACKGROUND OF THE INVENTION

High frequency wave transmission systems are commonly used for transmitting radio frequency signals in a number of applications such as two-way mobile radio equipment and the like. If the transmission lines and wave guides of such systems are not correctly terminated in a proper load circuit, reflected waves travel back from the load end of the transmission line to the input or source end of the line, with the magnitude and phase of the reflected wave depending upon the characteristics of the termination. These reflected waves cause degradation of performance of the system; so that it is extremely useful in conjunction with systems using such high frequency transmission lines to provide measurements of the magnitudes of the forward and reflected waves, the standing wave ratio (VSWR) or the reflection coefficient of the transmission line and the power transmitted.

To accomplish these measurements, RF power monitors have been provided in the form of accurately constructed coaxial transmission line sections or the like of known characteristic impedances. These sections have a provision for insertion of a loop or probe through one side of the transmission line, with the ends of the loop being terminated in a series resistance and a measuring device, respectively. With the measuring device at one end and the resistor at the other end, the loop operates as a directional coupler, capacitively and inductively coupled to the inner conductor of the line; so that the monitoring device or meter indicates the magnitude of a traveling wave in one direction in the transmission line. Reversal of the loop or the aforementioned terminations then permits a measurement of the magnitude of traveling waves in the opposite direction.

For facilitating ease of maintenance of RF equipment, it often is desirable to permanently install such a short transmission line coupler into the circuit and to provide a meter output terminal or test point, so that measurements of the traveling wave magnitudes in the transmission line or wave guide of which the coupler is a part may be made quickly and easily whenever desired. Because of the wide range of RF power and frequencies employed in different RF systems, it generally is necessary to employ couplers of different dimensions for each of the several different ranges of power and frequency which may be encountered. It is desirable to minimize the number of different types or sizes of couplers which are needed for use over a wide range of applications.

SUMMARY OF THE INVENTION

It is an object of this invention to provide an improved high frequency coupler.

It is an additional object of this invention to utilize a radio frequency power monitor having a multiple turn coupling loop, varying the number of turns of the loop in accordance with the RF power and frequency range with which the coupler is to be utilized.

It is a further object of this invention to provide a universal RF power monitor.

In accordance with a preferred embodiment of this invention a high frequency coupler includes an air dielectric coaxial line with axially disposed inner and outer conductors. The inner conductor is spaced and supported within the outer conductor, and first and second axially spaced openings are provided in the outer conductor to accommodate a multiple turn coupling loop formed by winding a loop conductor over the outer conductor between the first and second openings. The outer conductor then acts as electrostatic shield between portions of the loop conductor located on opposite sides of the outer conductor. By changing the number of turns in the coupling loop, a single basic assembly may be used over a wide RF power and frequency range.

DETAILED DESCRIPTION

Figure 1:
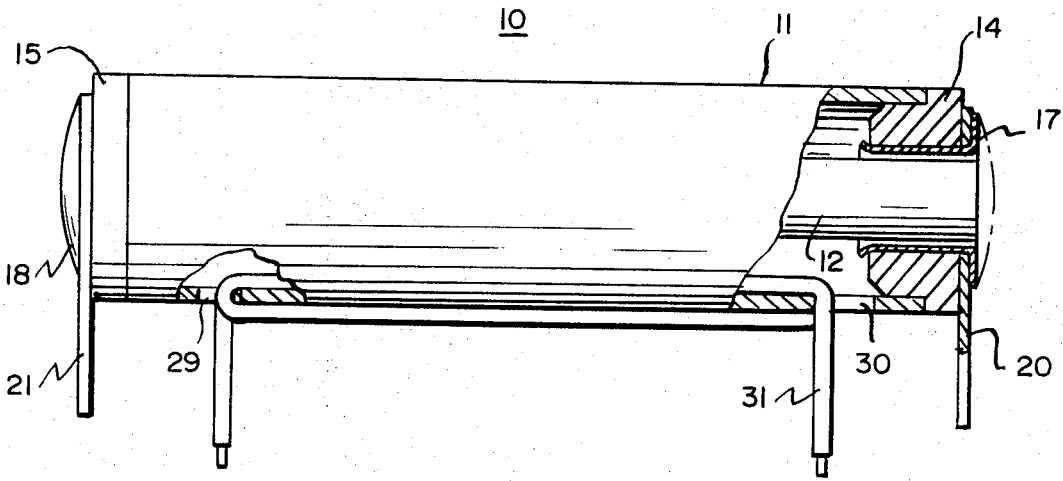
FIG. 1 is a partially cut-away side view of an RF coupler in accordance with a preferred embodiment of this invention.

Referring now to the drawing, wherein like reference numbers are used throughout the several views to designate the same elements, there is shown a basic structure for an RF power monitor which may be utilized in conjunction with RF equipment operating over a wide power and frequency range. The power monitor includes a section of coaxial cable 10 having an outer conductor 11 and an inner conductor 12, spaced from one another by a pair of dielectric end caps 14 and 15 to form an air dielectric coaxial cable. The end caps 14 and 15 have openings through them to permit the passage of the inner conductor 12 and eyelets 17 and 18, respectively, with the eyelets being utilized to secure terminal lugs 20 and 21 to the end caps 14 and 15. The eyelets 17 and 18 also provide electrical connections between the inner conductor 12 and the lugs 20 and 21, which permit the mounting of the assembly 10 directly on a printed circuit board or the like.

To use the coaxial cable section 10 as an RF directional power monitor capable of operating over a wider power and frequency range than normally possible for a section of given dimensions, a pair of openings 29 and 30 are provided in the outer conductor 11. An insulated conductor 31 is passed through one of these openings, 29 for example, along the inside of the outer conductor 11 in the air space between the conductors 11 and 12 to the other opening and back over the outside of the conductor 11 from the opening 30 to the opening 29, whereupon the conductor 31 once again is treaded along the inside of the outer conductor 11 to exist from the opening 30. Of course, the conductor 31 could also form a single turn coupler instead of the double turn or double loop coupler just described and which is shown in FIG. 1. On the other hand, if more than 2 turns were desired, the conductor 31 could be wound an additional number of times over the section of the outer conductor 11 between the openings 29 and 30 to provide the desired number of coupling turns.

By winding the conductor 31 back over the outside of the outer coaxial conductor 11 and then through the coaxial line to form an additional turn in the coupling loop, the voltage output of the loop is increased due to the increased coupling by approximately the same amount as would be obtained by doubling the length of the coaxial line section 10. Thus, a single basic assembly may be used over a wide RF power and frequency range merely by changing the number of coupling loops formed in the loop conductor 31 since corresponding increases in the loop output voltage are obtained for each additional turn. The outer conductor 11 of the coaxial section 10 functions as an electrostatic shield between the inner and outer turns of the conductor 31, thereby isolating the portions of the conductor 31 carrying current in opposite directions to permit the above-mentioned increased coupling with an increased number of turns.

Figure 2:
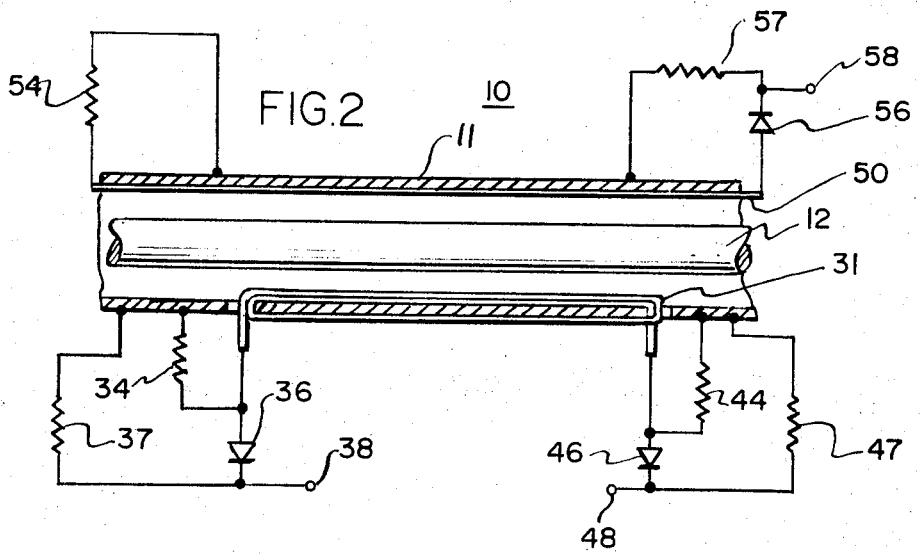
FIG. 2 illustrates, in partially schematic form, the coupler of FIG. 1 used as a directional RF power monitor.

To use the assembly shown in FIG. 1 as an RF directional power monitor it merely is necessary to terminate one or both ends of the conductor 31 in a resistor 34 or 44 (FIG. 2) and to connect an RF detector and indicating device at the other or both ends. These monitoring terminations are shown in FIG. 2 as series connections of diodes 36 and 46 with resistors 37 and 47, respectively; and the resistors 34, 44, 37, and 47 are connected to ground provided by the outer conductor 11 of the coaxial assembly. Meter output terminals 38 and 48 are provided at the junctions of the diodes 36 and 46 with the resistors 37 and 47 to provide simultaneous measurement of the magnitude of the wave in opposite directions. In FIG. 2 the coupling loop 31 is shown as a two turn coupling loop. It should be apparent however, that the number of turns in the loop 31 may be adjusted to any desired number in order to obtain the desired measurements from the output or meter terminals 38 and 48, respectively.

If for any reason it is desired to provide a different ratio of coupling for waves in opposite directions, an additional coupling loop 50 (FIG. 2) may be provided with terminations in the form of a resistor 54 at one end and a diode and series resistor combination 56 and 57 at the other end. An output or meter terminal 58 then may be provided between the junction of the diode 56 and the resistor 57. The coupling loop 50 with its termination can be provided in addition to or to supplement one of the sets of terminations provided for the coupling loop 31 described previously.

In FIG. 2 the coupling loop 50 is shown as a single turn conventional coupling loop, while the loop 31 is indicated as a two turn loop, thereby coupling a different voltage output at the output terminal 58 from that which is obtained from the meter terminals 38 and 48. It should be apparent, however, that the number of turns in the loops 31 and 50 may be adjusted to any desired ratio in order to obtain the desired measurements from the output terminals 38, 48 and 58 in accordance with the manner in which these outputs are to be utilized.

The inner and outer conductors 12 and 11, respectively, may be made of any conventional materials normally used in coaxial lines such as copper, aluminum, etc. By employing a single standard length of coaxial section 10, with the terminal lugs 20 and 21 uniformly spaced, the RF directional power monitor may be permanently mounted into a wide range of RF equipment, such as mobile radios, merely varying the number of turns of the loop conductors 31 and 40 to adjust the monitor to the power and frequency characteristics of the particular radio with which the monitor is to be used. Because a single standard size may be used over a wide range of applications, the cost of the power monitor is reduced to a point where it is possible to utilize a permanently connected power monitor in circuits where such a utilization heretofore has not been economically feasible.

Although the voltage output of the loop is increased directly in proportion to the number of turns made in the loop conductor 31 or 40, it should be noted that little or no change in the loop characteristic impedance takes place with the different numbers of turns.

I claim:

1. A high frequency coupler including in combination:

a coaxial line having axially disposed inner and outer conductors;

support means for spacing and supporting the inner conductor within the outer conductor;

first and second axially spaced openings in the outer conductor;

a coupling loop having a plurality of turns and which extends through the first opening and in the space between the inner and outer conductors to the second opening, returns over the outside of the outer conductor to the first opening and extends from the first opening to the second opening in the space between the inner and outer conductors to form the second and any additional ones of the plurality of turns of the coupling loop, so that current flowing in the turns of the loop located between the inner and outer conductors flows in the same direction simultaneously in all of the turns.

2. The combination according to claim 1 wherein the support means are dielectric support means.

3. The combination according to claim 1 wherein the first and second axially spaced openings in the outer conductor are openings in the side wall of the outer conductor.

4. The combination according to claim 3 wherein said coaxial line has a predetermined length and further including first and second dielectric end caps spacing the inner and outer conductors and sealing the ends of the coaxial line, and terminal means fastened on the end caps and in electrical contact with at least one of the inner and outer conductors for enabling mounting of the coupler on a printed circuit board.

5. The combination according to claim 1 wherein the coupler is a power monitor further including indicator means for terminating the loop conductor to provide an indication of the magnitude of traveling waves in at least one direction on said line.

6. The combination according to claim 5 further including a second coupling loop inserted in the space between the inner and outer conductors and terminated by second indicator means for measuring the magnitude of traveling waves traveling in an opposite direction from the traveling waves measured by the first coupling loop.

7. The combination according to claim 5 wherein the indicator means for terminating the loop conductor includes a unidirectional conductive means coupled with one end of the loop conductor and impedance means coupled with the other end of the loop conductor.

* * * * *